United States Patent Office 2,728,772
Patented Dec. 27, 1955

2,728,772
ADRENOCHROME ISONICOTINIC ACID HYDRAZONE

Norman Barsel, Laurelton, N. Y., assignor to International Hormones, Inc., Brooklyn, N. Y., a corporation of New York No Drawing. Application December 9, 1953, Serial No. 397,273

1 Claim. (Cl. 260—295)

The present invention relates to a novel adrenochrome derivative.

More particularly, the present invention relates to the novel compound adrenochrome isonicotinic acid hydrazone and to a process for the production thereof.

In the United States Patent Number 2,506,294, of May 2, 1950, there is disclosed certain adrenochrome derivatives such as the mono-oxime, semicarbazone, etc. In accordance with the patent, these adrenochrome derivatives are produced by reacting salts of hydroxylamine or semicarbazide with adrenochrome. The resultant products are stated to be stable derivatives of adrenochrome having valuable haemostatic properties.

In accordance with the present invention, it has been discovered that still another adrenochrome derivative having valuable haemostatic properties may be prepared by the reaction of isonicotinic acid hydrazide with adrenochrome. The resultant compound, the isonicotinic acid hydrazone of adrenochrome is a valuable haemostat and especially when used, in the form of a complex or other combination, with non-toxic water soluble salts such as the sodium salt of 3-hydroxy-2-naphthoic acid as more fully described in the copending application of Fleischhacker and Barsel, Serial Number 397,268, filed as of even date herewith.

The following reaction serves to illustrate the process of the present invention.

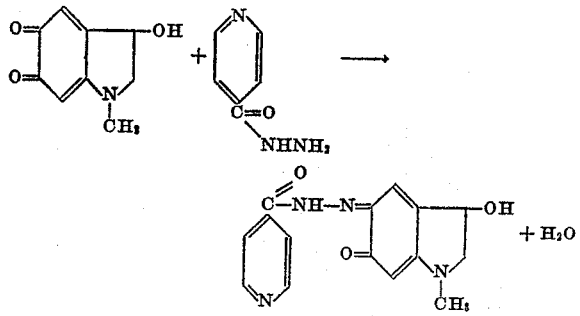

In proceeding in accordance with the above equation, a suitable quantity of adrenochrome is dissolved in an ethyl alcohol-water solution (containing 80% by volume of ethyl alcohol) so as to form a clear solution, approximately 20 cc. of solvent being utilized for each gram of adrenochrome. Thereafter, a solution of isonicotinic acid hydrazide dissolved in 80% alcohol is added thereto. The reaction solution is then allowed to stand at room temperature over night. The resultant precipitate of isonicotinic acid hydrazone of adrenochrome is then filtered from the reaction mixture and washed with ethyl alcohol.

Although it is preferred to form the hydrazone by reaction in an ethyl alcohol-water solution as hereinbefore described, other solutions of lower aliphatic alcohols may be used or other compatible inert organic solvents. Further, although the reaction at approximately room temperature is preferable, careful heating may be employed for shorter periods.

The following specific example serves to illustrate but is not intended to limit the present invention:

Example 10.0 g. of adrenochrome prepared by the oxidation of adrenalin with silver oxide is dissolved in 300 cc. of 80% ethyl alcohol-water. To the alcohol-water solution of adrenochrome is added 7.0 g. of isonicotinic acid hydrazide dissolved in 100 cc. of 80% ethyl alcohol-water. The two solutions are thoroughly mixed and the reaction mixture is then allowed to stand at room temperature overnight. The precipitate was washed with ethyl alcohol. The resulting compound was the isonicotinic acid hydrazone of adrenochrome having a melting point of 210°–213° C., with decomposition and the following formula:

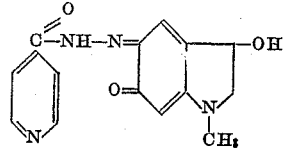

I claim:
The isonicotinic acid hydrazone of adrenochrome having the following formula:

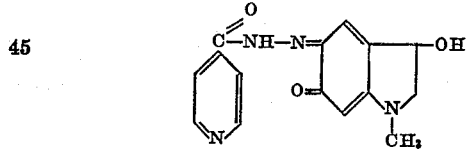

References Cited in the file of this patent
UNITED STATES PATENTS

| | | |
|---|---|---|
| 2,506,294 | Dechamps | May 2, 1950 |
| 2,581,850 | Fleischhacker | Jan. 8, 1952 |
| 2,655,510 | Sobotka | Oct. 13, 1953 |

OTHER REFERENCES
Sidgwick: Org. Chem. of Nitrogen, page 393 (1937).